United States Patent [19]
Theurillat et al.

[11] Patent Number: 5,847,520
[45] Date of Patent: Dec. 8, 1998

[54] METHOD AND APPARATUS FOR ADJUSTING THE ELECTRIC POWER DISTRIBUTION IN A MOTOR VEHICLE, IN PATRICULAR A HYBRID-POWERED VEHICLE

[75] Inventors: Patrick Theurillat, Yverdon-les Bains; Gianni Francescutto, Bienne; Robert Apter, Yverdon-les Bains, all of Switzerland

[73] Assignee: SMH Management Services AG, Biel, Switzerland

[21] Appl. No.: 774,729

[22] Filed: Jan. 3, 1997

[30] Foreign Application Priority Data

Jan. 5, 1996 [FR] France .................. 96 00093

[51] Int. Cl.⁶ ........................................... B60L 11/08
[52] U.S. Cl. ............................... 318/139; 318/151
[58] Field of Search .................. 318/139, 140, 318/141, 145, 148, 151, 152, 153, 375, 376; 180/65.1, 65.2, 65.3, 65.4, 65.6, 65.8

[56] References Cited

U.S. PATENT DOCUMENTS

| | | | |
|---|---|---|---|
| 5,212,431 | 5/1993 | Origuchi et al. | 318/139 |
| 5,345,761 | 9/1994 | King et al. | 60/274 |
| 5,359,308 | 10/1994 | Sun et al. | 318/139 X |
| 5,428,274 | 6/1995 | Furutani et al. | 318/139 |
| 5,765,656 | 6/1998 | Weaver | 80/65.3 |
| 5,778,326 | 7/1998 | Moroto et al. | 701/22 |

FOREIGN PATENT DOCUMENTS

| | | |
|---|---|---|
| 460 850 | 12/1991 | European Pat. Off. . |
| 543 390 | 5/1993 | European Pat. Off. . |
| 645 278 | 3/1995 | European Pat. Off. . |
| 4 344 053 | 7/1994 | Germany . |
| 93/07022 | 4/1993 | WIPO . |

OTHER PUBLICATIONS

12th International Electric Vehicle Symposium, 5–7 Dec. 1994, Anaheim US, pp. 458–469, XP000488445 O. Vittone: "Fiat Conceptual Approach to Hybrid Cars Design".

*Primary Examiner*—Bentsu Ro
*Attorney, Agent, or Firm*—Griffin, Butler, Whisenhunt & Szipl

[57] ABSTRACT

The invention concerns a method for adjusting the electric power distribution in a direct voltage supply circuit (2) in a motor vehicle, e.g. a hybrid-powered vehicle comprising an electric generator set (1) and one or several electric elements (3, 6, 7, 8) capable of consuming and/or producing power in the supply circuit, one of said electric elements being an electric driving set (3) capable of driving the driving wheels (4) of the vehicle.

The power of the generator set is adjusted on the basis of a power demand given by the driver. One (3, 7) of said electric elements is defined as a power balancing element. A desired voltage ($U_{Oc}$) of the supply circuit is determined, the effective voltage ($U_O$) of said circuit is continuously monitored, and the power of the balancing element is adjusted so as to maintain the effective voltage at the level of the desired voltage.

19 Claims, 10 Drawing Sheets

METHOD AND APPARATUS FOR ADJUSTING THE ELECTRIC POWER DISTRIBUTION IN A MOTOR VEHICLE, IN PATRICULAR A HYBRID-POWERED VEHICLE

The present invention concerns a method for adjusting the electric power distribution in a direct voltage supply circuit in a motor vehicle comprising several electric elements capable of consuming and/or producing power in the supply circuit, one of said electric elements being an electric driving set capable of driving at least one driving wheel of the vehicle. The invention also concerns a driving system capable of applying such a method.

The invention applies in particular to hybrid-powered vehicles of the series type, provided with a generator set which comprises a thermal engine driving an electric generator, but it can also be applied to parallel or mixed series-parallel hybrid-powered vehicles, and purely electric vehicles, where the electric power necessary for traction is provided by a source other than a generator set, for example an accumulator battery, a fuel cell or photovoltaic cells.

A hybrid-powered motor vehicle of the series type comprises a generator set having a thermal engine coupled to an electric generator, which provides electricity to a supply circuit, generally a direct voltage supply circuit, so that an accumulator battery can be connected to such circuit. A driving set comprising one or more electric motors is supplied by the supply circuit to drive the driving wheels of the vehicle. In most applications, the driving set can also effect electric regenerative braking, thus providing electric energy to the supply circuit. This energy may be consumed by other elements connected to the supply circuit, for example it may be stored in chemical form in an accumulator battery, or stored in a kinetic energy accumulator, or be dissipated thermally in a safety element intended to absorb surplus energy. Thus, the direct voltage supply circuit exchanges at each moment different power flows with the elements connected thereto. These flows vary in particular over time, because of the preponderance of transient states in motor vehicle driving systems. Since the algebraic sum of such flows must be zero at each moment, apart from losses in the circuit itself, it is necessary to adjust one or more of these flows so as to achieve equilibrium while obtaining at least approximately the traction or braking power desired by the driver of the vehicle.

The conventional method for controlling these power flows uses the exact knowledge of the powers produced and consumed by all the elements of the system. This method requires calculating the power which each element must produce or consume in order to obtain equilibrium of the circuit. It is thus necessary to know precisely the method for adjusting each component of the system in order to achieve proper overall adjustment. Even if an element consumes a power which is not significant in the operation of the system, it must be known, and known in a precise manner. Consequently, the application of this method for controlling a system wherein N elements are connected to the supply circuit requires the use of at least N-1 current sensors. Such sensors do not generally offer great precision over a broad measuring range, which introduces margins of error into the adjustment and often requires additional adjustment to assure stability. When a battery is connected to the supply circuit, it may be necessary to give priority thereto in the adjusting process, because it does not withstand fluctuations in current very well, it is fragile and relatively expensive. The implementation of such priority in the adjusting method represents an additional complication.

In a system operating without a buffer battery and without a safety element for absorbing surplus power, the power measurement adjusting method is not possible, since all the power produced must be consumed immediately. The overall adjustment of the system must thus be treated differently, in particular so that, in driving mode, the power of the thermal engine and the generator set in general and the power of the driving set are equal at each moment.

Methods and apparatus for regulating a series hybrid driving system in a motor vehicle are disclosed in particular in patent applications WO 93/07022, EP-A-0 460 850, EP-A-0 543 390, EP-A-0 645 278 and DE-A-4 116 899. These apparatus comprise a central regulating unit which receives, in addition to the acceleration or braking set-point signals given by the driver, various signals representative of the state of the system, from various sensors always comprising one or more current sensors, in order to allow the calculation of one or more power flows entering or leaving the supply circuit.

For example, document EP-A-0 543 390 discloses a driving control device in a series hybrid vehicle provided with a generator set comprising a thermal engine and a direct current generator connected to the supply circuit. This circuit supplies a driving set which comprises a DC/AC converter and a three-phase electric motor. This motor drives two driving wheels via a differential gear. A battery directly connected to the supply circuit allows three modes of supplying the driving set according to the power demanded from the latter, namely supply solely by the battery in a low power range, supply solely by the generator set in a medium power range, corresponding to a good thermal engine efficiency, and supply by the generator set and the battery in a high power range. Adjustment of the whole is assured by an electronic unit which receives the set-point signals from the driver and signals representing the state of the system, namely the current produced by the direct current generator, the input current or the output current of the battery, the voltage of the supply circuit and the speed of the electric motor. On the basis of this information, the adjusting unit determines the different power flows by acting on the fuel supply of the thermal engine, on the excitation current of the generator to obtain a determined voltage of the supply circuit, and on the DC/AC converter of the driving set. Thus, at the same time, it controls the electric power produced by the generator set and the electric power consumed by the driving set, and it adjusts the balance of the three power flows concerned by monitoring two thereof, at the terminals of the battery and at the output terminals of the generator. With such a method, the adjustment quality and balance are essentially dependent upon the precision of the current measurements. However, this precision is not good, because of the very large range of variation in the direct current intensities in such a motor vehicle driving system. There may thus result imprecise and unstable adjustments, leading in particular to undesirable fluctuations in the current at the battery terminals, reducing the lifespan of this latter. Another disadvantage of such a method is that it must be fundamentally transformed if other electric apparatus are connected to the supply circuit, for example a kinetic power accumulator, an air-conditioning device etc., or if there is no buffer battery. In short, any addition or removal of a power flow to or from the supply circuit requires a significant modification of the adjustment method and apparatus.

The same problem arises in the case of a purely electric vehicle, since the latter operates like a hybrid-powered vehicle whose generator set has been put out of operation, the traction energy being provided by an electric source which may or may not be adjustable.

It is an object of the present invention to avoid the aforecited disadvantages of the prior art, as a result of a method allowing adjustment of the power flows between the various elements of the system to be effected in a simple, reliable and economical manner, which can be applied advantageously to different configurations of the driving system, in particular with or without a battery, and with or without a safety element connected to the supply circuit, without requiring radical changes in the basic adjustments for passing from one system to another. Another object consists of obtaining stable and reliable adjustment of the system, in particular avoiding as far as possible the use of current sensors.

Another object is to be able to control the operation of a battery while avoiding ripples in the current at the terminals of the latter, in order to increase its lifespan.

Finally, the method should offer maximum flexibility in the adjustment of the power flows, i.e. it should allow a broad range of combinations for obtaining optimum efficiency of the system, and advantageous vehicle ergonomics.

The invention thus concerns a method of the kind indicated in the preamble hereinabove, characterised in that one of said electric elements is defined as a power balancing element, which exchanges an adjusted power with the supply circuit, in that a desired voltage of the supply circuit is determined, in that an effective supply circuit voltage is continually monitored and in that said adjusted power of the balancing element is adjusted so as to maintain said effective voltage at the level of said desired voltage.

The balancing element is preferably the driving set, but other choices are possible, as will be described hereinbelow.

One of said electric elements may be a generator set able to exchange upon demand a first power with the supply circuit, while the balancing element is another of said electric elements.

Thus, control means can determine said first power to be provided by the generator set essentially according to a power or torque demand made by the driver, without having to adjust such power in real time on the basis of the distribution of the electric power flows in the supply circuit. The adjustment to be effected by an electronic unit consists essentially in monitoring the supply circuit voltage, which will increase if consumption is insufficient or decrease if consumption is too high, comparing this effective voltage with a desired voltage and, in the event of a difference, adjusting the power of the balancing element so as to revert the voltage to the desired value. In driving mode, it is easy to effect this adjustment on the driving set, because it is often the principal consumer and in most cases it comprises a DC/AC converter offering wide adjustment possibilities.

The choice of the supply circuit voltage as an essential adjustment parameter is advantageous in many ways. It concerns a common parameter to all the elements connected to the circuit, whatever the number and nature of the latter. Such voltage varies within a small range and may be measured with precision. The control unit defines the desired voltage as a function of a desired distribution of the power flows, and then the adjustment can be effected without measuring these flows, thus without using current sensors.

There results, firstly, a high level of adjustment stability and reliability, and, secondly, great facility for adapting the adjustment unit to different configurations of the driving system, according to whether or not a battery and a safety element are present.

In the event that a battery is connected to the supply circuit, adjustment based on the voltage is especially advantageous because the desired voltage may be selected as a function of the features of the battery and in particular its state of charge, and such choice allows the power consumed or absorbed by the battery to be predetermined. It allows in particular the current to be easily stabilised at the battery terminals at zero value, as will be explained hereinbelow.

The method according to the invention also has the advantage of applying in the same manner, if required, to the electric braking mode and driving mode, also with different configurations of the driving system. The driving set can then be chosen as the balancing element, said driving set providing in such case the supply circuit with power, or a consumer element such as a safety element.

It should be noted that document EP-A-0 645 278 discloses a control method for a series hybrid vehicle having a buffer battery connected to the supply circuit, wherein an electronic control unit monitors the voltage and the state of charge of the battery for controlling the electric power flows. However, adjustment via this method is much less simple and stable than that of the present invention, because it requires calculating the effective power of the driving set from measurements of its torque and speed, or from the current and the voltage of the electric motor, then retroacting on the generator set as a function of this power and the state of charge of the battery to maintain said state within certain limits. It is thus the battery which assures the precise balancing of the power flows, by undergoing almost constantly charging and discharging cycles.

The present invention also concerns a motor vehicle driving system, in particular for the implementation of the method according to the invention, said system comprising several electric elements capable of consuming and/or producing power in the supply circuit, one of said elements being an adjustable electric driving set capable of driving at least one driving wheel of the vehicle, and control means arranged for controlling the power of one of said electric elements, defined as a power balancing element, which exchanges a second power with the supply circuit, the control means being arranged so as to continuously monitor an effective supply circuit voltage, characterised in that said control means comprise an electronic adjustment unit associated with the balancing element and arranged for adjusting the power of the latter on the basis of a desired voltage defined by the control means, so as to maintain said effective voltage at the level of said desired voltage.

Other features and advantages of the invention will appear in the following description of different embodiments, presented by way of example with reference to the attached drawings, in which.

Figure 1:
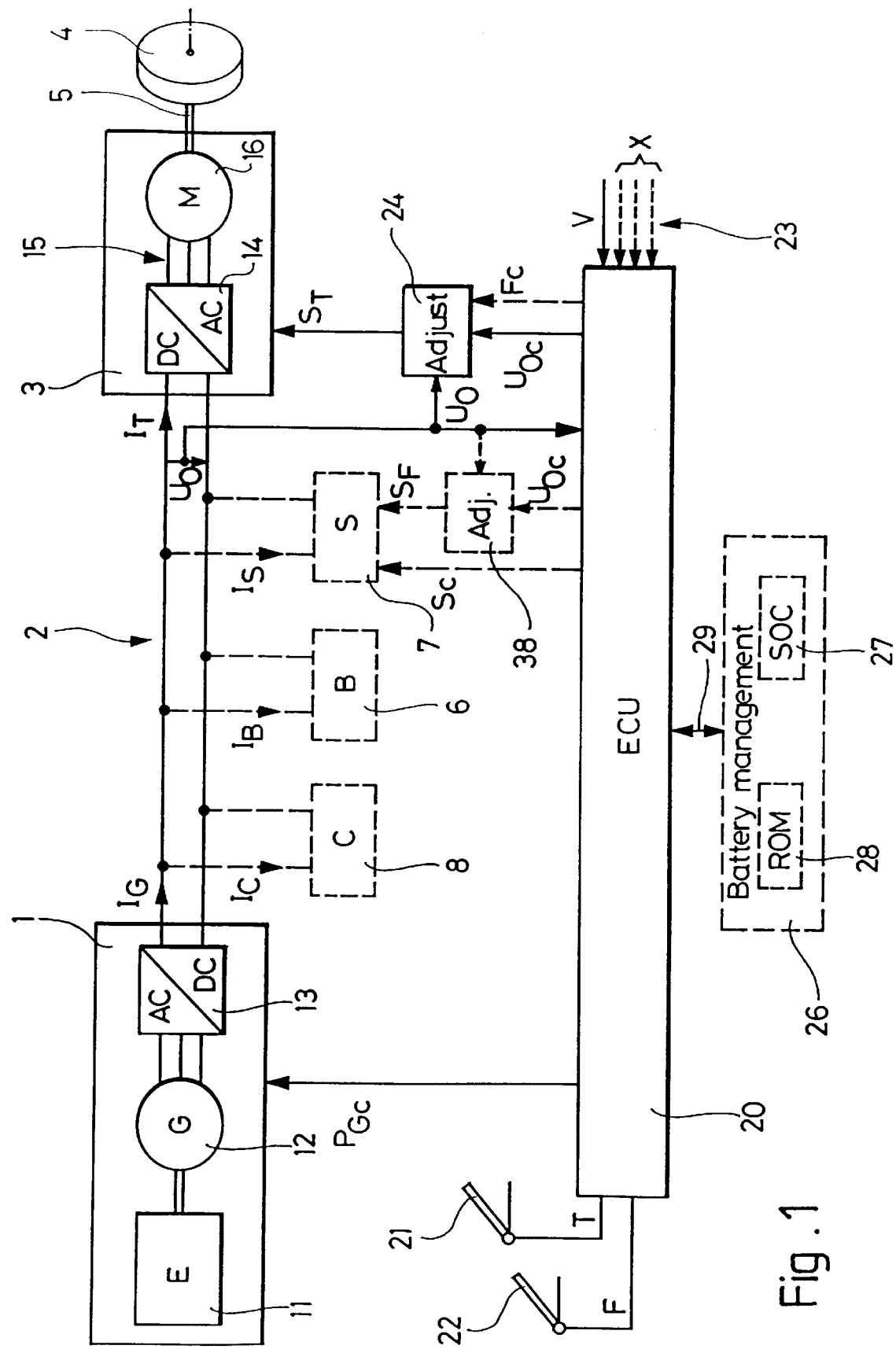
FIG. 1 is a general block diagram of a series hybrid-powered vehicle driving system wherein the method according to the invention is applied.

Referring to FIG. 1, the example described here concerns the driving system of a hybrid-powered vehicle of the series type, comprising a generator set 1, arranged for supplying a direct electric current IG at a direct voltage $U_0$ to a bifilar supply circuit 2. Such circuit supplies a driving set 3 which drives at least one driving wheel 4 of the vehicle via a shaft 5 or via any other mechanical transmission means. Of course, the vehicle usually comprises several driving wheels, driven either by a common electric motor, or by individual electric motors.

In the general case shown here, supply circuit 2 is also connected to an accumulator battery 6 acting as a buffer, to a safety element 7 intended to absorb surplus energy, and to one or more consuming elements 8, for example a passenger space heating and air-conditioning device. In order to show that elements 6, 7 and 8 are optional, they have been drawn in dashed lines in FIG. 1.

In the embodiment shown, generator set 1 comprises in a known manner a thermal engine 11, for example of the Otto, Diesel or gas turbine type, driving a three-phase generator 12, for example of the asynchronous or brushless type, and an AC/DC converter 13 which supplies direct current IG to supply circuit 2. In other embodiments, generator set 1 could comprise a direct current generator or consist of any other on-board adjustable power source, such as a fuel cell, photovoltaic cells associated with a DC/DC converter etc..

Driving set 3 shown schematically in FIG. 1 comprises an electronic DC/AC converter 14 which is coupled via a three-phase network 15 to one or more electric machines 16, for example of the asynchronous or brushless type. Each electric machine 16 is preferably coupled to a single driving wheel 4 via its shaft 5, and it may operate as a traction motor as well as an electric regenerative brake generator, thus supplying power to supply circuit 2 via common converter 14.

The operation of the driving system is controlled by an electronic control unit 20 as a function of the state of the system and as a function of the commands given by the driver, which are shown schematically here by an accelerator pedal 21 supplying a traction command signal T and a brake pedal 22 supplying an electric braking command signal F. Command signals T and F preferably each have a variable amplitude representing a performance desired by the driver. Both signals T and F could come from the same pedal.

In order to know the state of the system, control unit 20 receives signals supplied by sensors which are not shown here, in order to simplify the explanation. The principal of such signals represents the effective voltage $U_0$ of supply circuit 2, i.e. the variable which plays the essential role in the method according to the invention. The other state signals 23 received by unit 20 are shown schematically in the drawing by a signal V, indicating the speed of shaft 5 of electric driving machine 16, and a group of signals X capable of indicating, for example, the presence of safety element 7, the switched on or off state of consumer 8, etc..

As is shown by FIG. 1, unit 20 controls the driving system by at least two set-point signals $P_{Gc}$ and $U_{0c}$. Signal $P_{Gc}$ continually indicates to generator set 1 the electric power which it must supply to supply circuit 2. In a known manner, set 1 comprises an electronic control unit which adjusts the output power of the set, in particular current IG, by acting in the present case on the supply of air and fuel of engine 11 and on generator 12 to adjust its resistant torque. Signal $U_{0c}$ acts solely on driving set 3. In the present example, it is transmitted to an electronic adjusting unit 24 which also receives the signal representing effective voltage $U_0$ of supply circuit 2. Adjusting unit 24 compares value $U_0$ to value $U_{0c}$ and, according to the result of such comparison, adjusts traction converter 14 by means of a signal $S_T$, which corresponds to an increase or decrease in the electric power of converter 14, thus also to a variation in the mechanical power of electric machine 16 functioning as motor or generator. In a known manner, the adjustment of converter 14 may vary the voltage, the current and/or the supply frequency on three-phase network 15.

In embodiments wherein electric braking controlled by signal F is provided, control unit 20 can also supply a braking torque instruction $F_c$ to adjusting unit 24 to modify consequently the action of driving set 3, as will be described hereinafter. Likewise, in the cases wherein a safety element 7 is provided, unit 20 can control such element by means of a signal $S_c$, as will be described hereinafter.

In embodiments comprising a battery 6, control unit 20 is associated or combined with a battery management unit 26 comprising, in particular, a block 27, which monitors the state of charge (SOC) of battery 6 and supplies a corresponding signal, and a block 28 such as a read only memory (ROM) or a fuzzy logic device, which contains characteristic data of such battery. Units 20 and 26 exchange signals 29 which will be described hereinafter.

Although a current measurement is preferably avoided in the method according to the invention, it is not excluded in all cases and may be used, in particular, for safety checks or for calculating the state of charge of the battery. However, methods for determining the state of charge without using current sensors are known.

FIG. 1 shows the direct electric currents entering and exiting supply circuit 2, with arrows indicating the positive direction. In the general case shown, the balance of the circuit can be described in an algebraic manner: $I_G = I_T + I_B + I_S$, wherein $I_T$ is the current flowing to the driving set 3, $I_C$ is the current flowing to the consuming element 8, $I_B$ is the current flowing to the battery 6, and $I_S$ is the current flowing to the safety element 7. By multiplying by common voltage $U_0$, a similar equation is obtained for the balance of the electric powers. The man skilled in the art will understand that if balance is not achieved, voltage $U_0$ of the supply circuit will increase if the power consumption is less than production, or decrease if consumption is greater than production. FIG. 1 shows that the method according to the invention then re-establishes the balance mainly by the adjustment of driving set 3, on the basis of the comparison between $U_0$ and $U_{0c}$. Conversely, generator set 1 which is the principal supplier of power in driving mode is controlled directly as a function of the command T (or F) given by the driver, without undergoing retroaction of driving set 3. In other words, in driving mode, the electric power introduced into the circuit by the generator set is a priori determined, and the circuit is balanced by the adjustment of one of the consuming elements so as to maintain effective voltage $U_0$ at the level of desired voltage $U_{0c}$. It is thus incumbent upon control unit 20 to determine such desired voltage as a function of the state of the system and the commands given by the driver. In electric braking mode, a similar method is applicable, but possibly in a different manner since the power supplied then originates from driving set 3. This is explained hereinafter for different configurations and different operating modes of the driving system, with reference to FIGS. 2 to 10.

Figure 2:
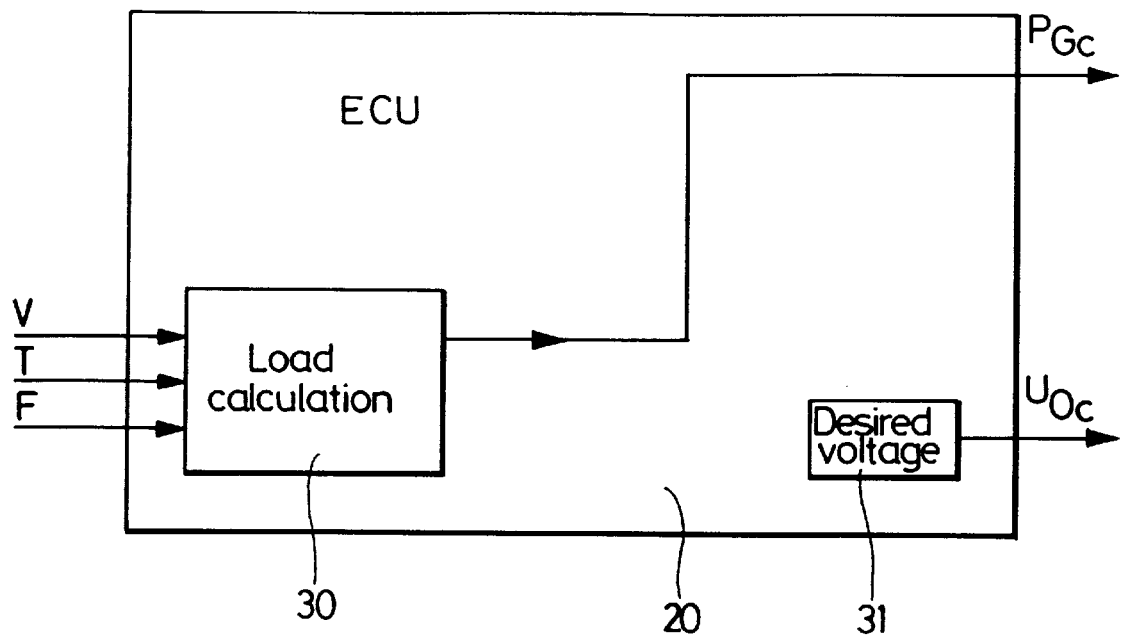
FIG. 2 is a block diagram of the control unit of the system of FIG. 1, in the case where such system is not provided with a battery and a safety element.

In a first, particularly simple configuration, the driving system shown in FIG. 1 comprises none of elements 6, 7 and 8. In driving mode, the electric power produced by generator set 1 must be entirely consumed by driving set 3. Signals $F_c$, $U_c$ and $S_c$, and likewise battery management unit 26 do not exist in this case. FIG. 2 shows the simplified block diagram of control unit 20 for such a configuration. Unit 20 comprises a load calculating unit 30 which receives command signals T and F given by the driver and supplies power set-point signal $P_{Gc}$ to generator set 1. Unit 30 preferably also receives at least one signal representative of the state of the driving set, for example, signal V, to be able to limit the electric power in order to avoid excessive intensities in the driving set when electric machine 16 rotates relatively slowly.

In order to act on the power adjustment of driving set 3, unit 20 comprises a desired voltage unit 31 which provides a signal $U_{0c}$ defining a desired voltage which may be constant. Unit 31 may thus be achieved for example in the form of a wired circuit. However, an alternative embodiment may also be provided wherein desired voltage $U_{0c}$ has a variable value, selected so that the chain efficiency is optimum. Account will then be taken of the features and state of the driving system, for example to obtain ratings at which the thermal engine has a good efficiency and low pollution rate. Unit 31 may then contain a range of $U_{0c}$ values in a read only memory, wherein it will choose an appropriate value as a function of the present state of signals T, F, V and possibly other signals which it could receive.

The simple configuration described hereinabove also allows the vehicle to brake electrically, i.e. to slow it down using driving machine 16 as a generator and "generator" 12 as a motor, to drive thermal engine 11 functioning as an engine-brake. Generator set 1 will then consume electric power determined by signal $P_{Gc}$, whereas driving set 3 will be automatically adjusted to such power by maintaining $U_0$ at the level of $U_{0c}$, as described hereinabove.

In the configurations wherein a battery 6 is connected to supply circuit 2, voltage $U_0$ depends directly on the voltage features of the battery. When the method according to the invention is applied to such a driving system, account is taken of such battery features to monitor the power flows in the system by selecting desired voltage $U_{0c}$ in a suitable manner.

Figure 3:
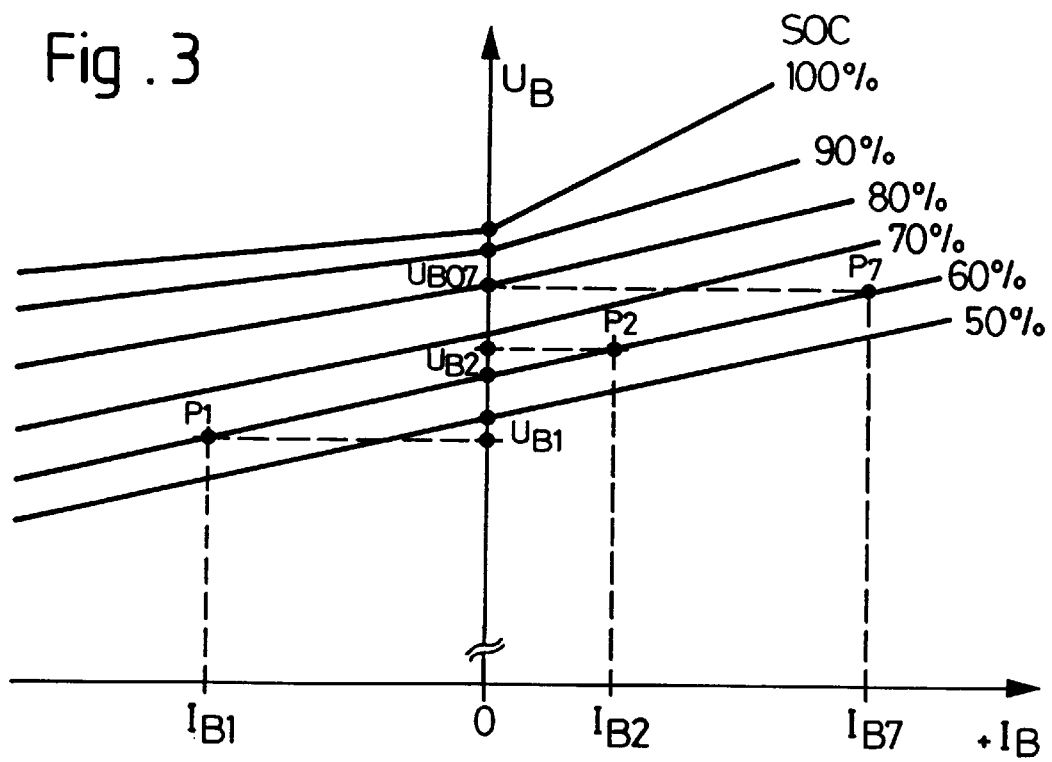
FIG. 3 is a schematic diagram of the current/voltage features at the terminals of a battery.
Figure 4:
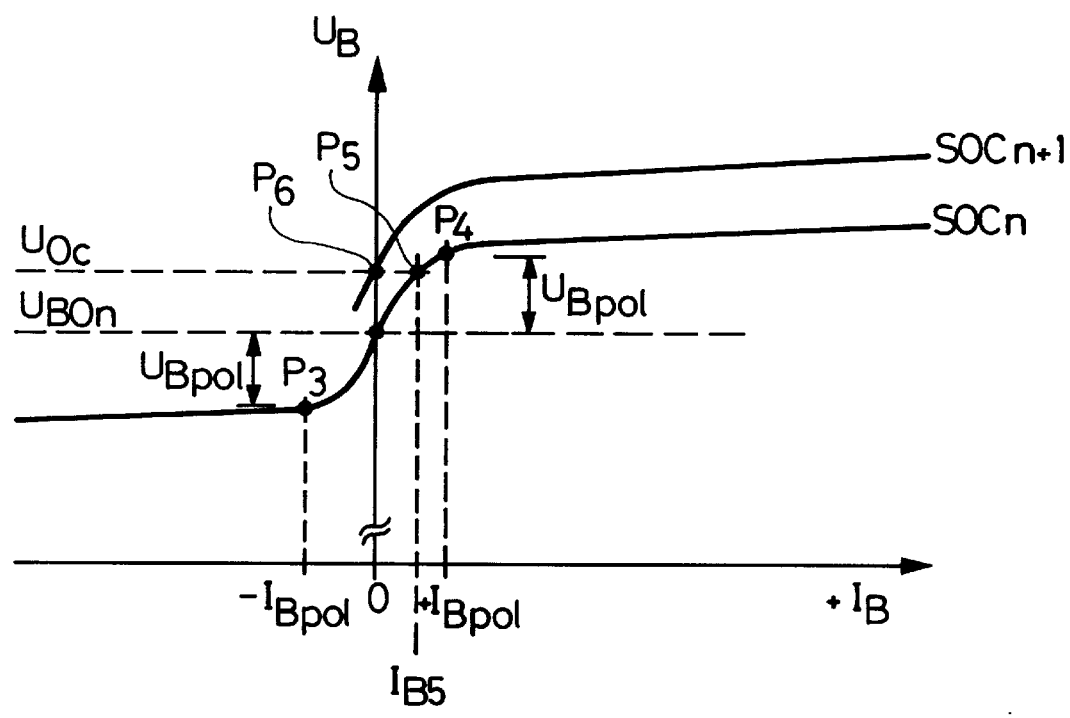
FIG. 4 shows a detail of the curves of FIG. 3 in an enlarged scale.

First of all some known features of a conventional battery will be recalled, with reference to FIGS. 3 and 4. FIG. 3 is a schematic diagram showing current $I_B$ (or power $P_B$) as a function of voltage $U_B$ at the terminals of battery 6 for various states of charge SOC of such battery. The current has a positive sign if it enters the battery and negative if it exits therefrom. When the current is zero, the battery has a no-load voltage $U_{B0}$ which varies with the state of charge SOC. By way of example and assuming that SOC=60%, an operating point $P_1$ has been shown where the battery supplies a current $I_{B1}$ with a voltage $U_{B1}$, and another operating point $P_2$ where the battery absorbs a current $I_{B2}$ with a voltage $U_{B2}$. In practice, the bundle of curves of FIG. 3 may, for example, be stored in an electronic unit in the form of a three dimensional table. Such table may be updated periodically, in particular to take account of the ageing or other parameters of the battery. Another known method consists, knowing a point on one of the curves, in calculating another point on such curve with the aid of a suitable algorithm.

FIG. 4 shows schematically, in a greatly enlarged manner, any one of the curves of FIG. 3 in the vicinity of the vertical axis $U_B$, i.e. in the vicinity of no-load voltage $U_{B0}$ for a state of charge $SOC_n$. In order for positive or negative current $I_B$ to be established at the battery terminals, a bias voltage $U_{Bpol}$ must be respectively added to or subtracted from open circuit voltage $U_{B0}$. Consequently, the curve has a very steep slope between a point $P_3$, corresponding to a voltage $U_{B0}-U_{Bpol}$ and a current $-I_{Bpol}$, and a point $P_4$ corresponding to a voltage $U_{B0}+U_{Bpol}$ and a current $+I_{Bpol}$. It will be noted that values $\pm I_{Bpol}$ are close to zero, the scale of FIG. 4 being greatly enlarged with respect to that of FIG. 3.

In the present invention, this feature is especially useful for stabilising the distribution of the electric powers when it is desired to cancel battery current $I_B$ by an appropriate choice of desired voltage $U_{0c}$. In the case of FIG. 4, the state of charge being $SOC_n$, it is suitable to choose $U_{0c}=U_{B0n}$. It is however possible to have a small error in the calculation of the state of charge, so that selected desired voltage $U_{0c}$ is, for example, slightly greater than $U_{B0n}$. Operating point $P_5$ then results therefrom, corresponding to a current $I_{B5}$ which enters the battery. Since this current is less than $I_{Bpol}$, it is very weak and practically does not affect the desired distribution of the power flows. Its only effect is gradually to charge the battery to a slightly higher state of charge $SOC_{n+1}$, the current gradually being reduced until operating point $P_6$, where $I_B=0$. The system thus tends towards the desired stable state, without the battery undergoing current fluctuations. Thus, the method according to the invention allows a particularly precise and stable adjustment when it is desired to keep low or zero values of the current in battery 6.

Conversely, with a method according to the prior art using adjustment based on current measurements, any error in measurement on one of the currents introduced an error into the distribution of the power flows, and such error could not be automatically removed. It was thus necessary to provide an additional delicate adjustment, based on monitoring the state of charge of the battery, in order to keep the latter within predetermined limits.

With the method according to the invention, if one wishes to draw a determined power from battery 6, the values represented by FIG. 3 are used for present state of charge SOC, since each corresponding point in curve SOC represents in an univocal manner a power $P_B=U_B \cdot I_B$.

For example, if the desired power corresponds to point P1 on curve SOC=60%, it is sufficient to fix instruction $U_{0c}$ at the value $U_{B1}$ corresponding to such point. Battery 6 will then supply current $I_{B1}$ to supply circuit 2. Likewise, if one wishes to charge battery 6 with a power corresponding to point P2, desired voltage $U_{0c}$ is fixed at value $U_{B2}$, and the battery will absorb $I_{B2}$. If one wishes to charge the battery to bring its state of charge SOC to a desired value of 80% for example, without taking account of the other parameters affecting the operation of the vehicle, $U_{0c}$ could theoretically be fixed at a value equal to the no-load voltage $U_{B07}$ of the battery for SOC=80%. One will thus have the intitial operating point $P_7$ and a charging current $I_{B7}$ at SOC=60% then this current will gradually decrease with the rise in the state of charge. Of course it is necessary to check that current $I_{B7}$ does not exceed a maximum admissible value, or otherwise a desired SOC will be selected lower than 80%. A similar method is applicable for discharging the battery to a lower state of charge than the present state of charge.

In each case, the adjustment of voltage $U_0$ via the action of adjustment unit 24 on the driving set maintains $U_0$ within very narrow limits which avoids substantial variations in the battery current and in the distribution of the power flows in general.

Figure 5:
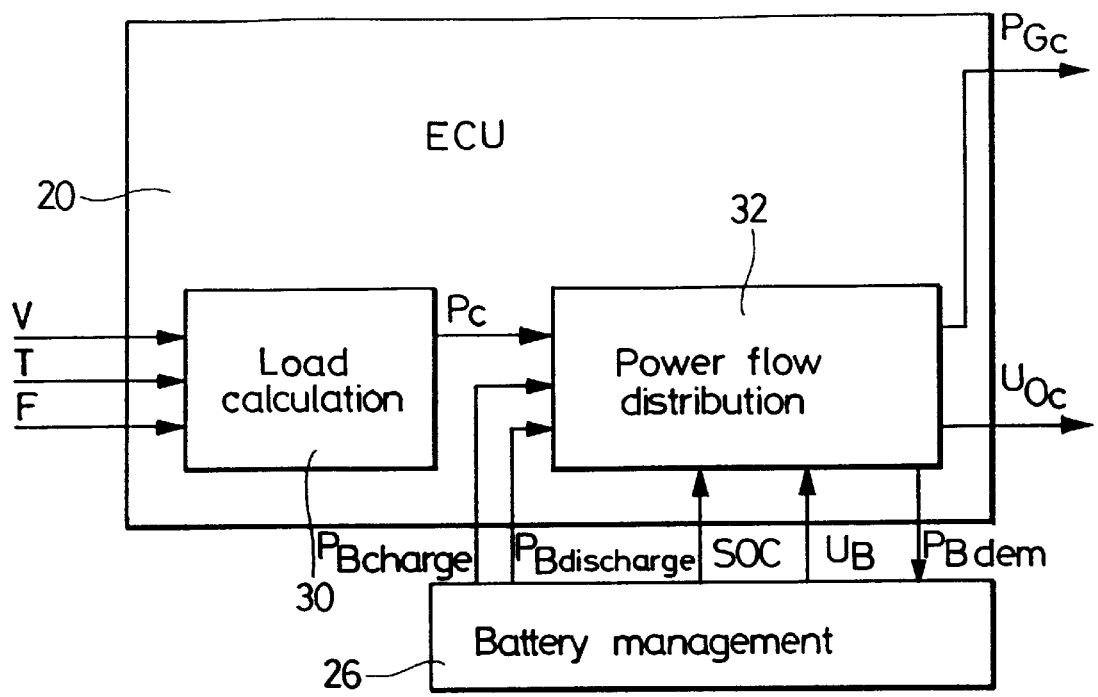
FIG. 5 is an block diagram of the control unit of the system of FIG. 1, in the case where the system comprises a battery.

FIG. 5 shows the arrangement of control unit 20 for applying the method described hereinabove, by controlling the operation of battery 6. Unit 31 of FIG. 2 is replaced by a power flow distribution unit 32, which receives signal $P_c$ and exchanges with battery management unit 26 the group of signals 29 shown in FIG. 1. The signals supplied by unit 26 include a signal SOC constantly indicating the present state of charge of battery 6, two signals $P_{charge}$ and $P_{discharge}$ constantly indicating the limits of the operating window of battery at this state of charge, namely the maximum admissible power respectively for charging and for discharging the battery, and a signal $U_B$ which responds to a required power signal $P_{Bdem}$ transmitted by unit 32. This power is positive for charging the battery, negative for discharging it or zero if one wishes to maintain the present state of charge. Signal $U_B$ indicates the voltage corresponding to required power $P_{Bdem}$, as has been explained hereinabove.

Unit 32 calculates signal $P_{Bdem}$ as a function of signal $P_c$, indicating the desired driving or braking power as in the case of FIG. 2, and of a choice of an optimum distribution of the power between the elements connected to supply circuit 2. This calculation takes account of SOC, $P_{Bcharge}$ and $P_{Bdischarge}$. Unit 32 then fixes desired voltage $U_{Oc}$ at value $U_B$ provided by unit 26, and it supplies to generator set 1 its power set-point signal $P_{Gc}$. Battery 6 will absorb or provide the power indicated by $P_{Bdem}$, whereas the driving set will maintain its power at a value equal to $P_{Gc}-P_{Bdem}$.

Figure 6:
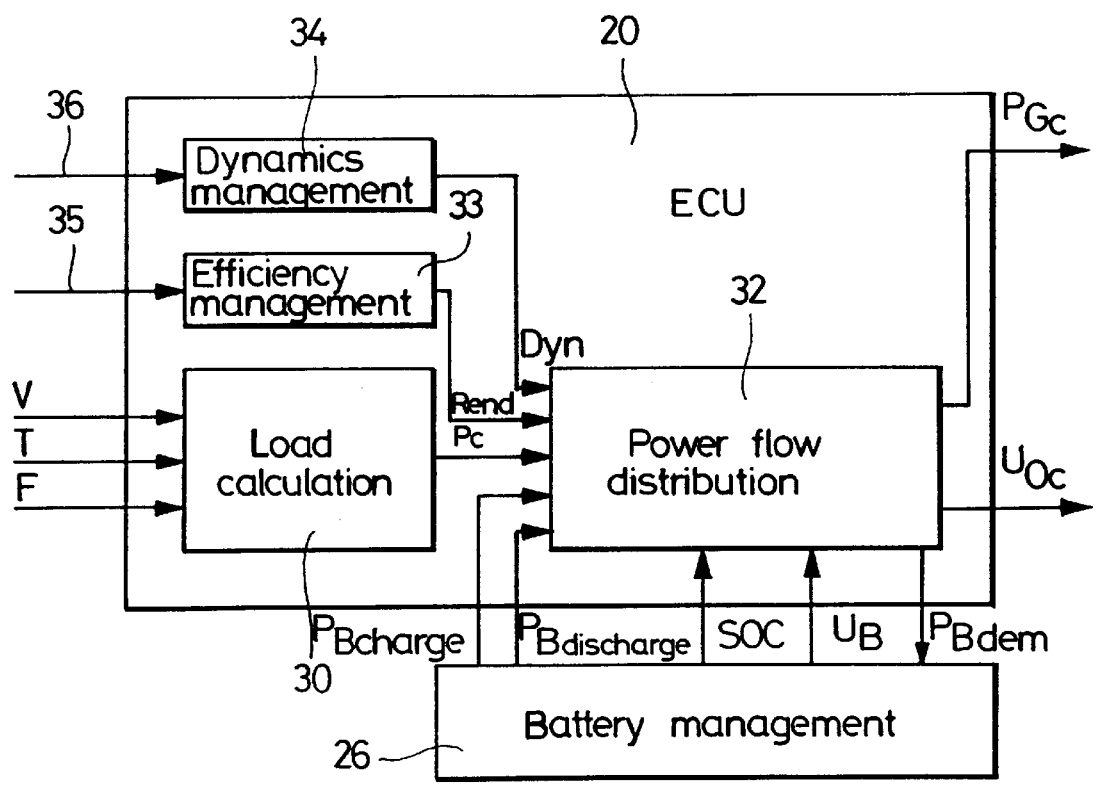
FIG. 6 shows an alternative of the diagram of FIG. 5.

FIG. 6 shows a improved modification of the diagram of FIG. 5, where power flow distribution unit 32 also receives signals Rend and Dyn allowing it to optimise the power distribution in real time, as a function of the present operating state of various elements of the vehicle. Control unit 20 then comprises a vehicle efficiency management unit 33 and a vehicle dynamics management unit 34. Unit 33 receives signals 35 indicating the present parameters of the state or efficiency of the elements concerned, and it calculates signal Rend on the basis of these signals and functions or algorithms to define a preferred power distribution which corresponds to an optimum global efficiency. Unit 34 receives signals 36 indicating present dynamic parameters of the vehicle and it consequently calculates signal Dyn, to allow unit 32 to anticipate the future state of the system when the optimum power distribution is chosen.

Figure 7:
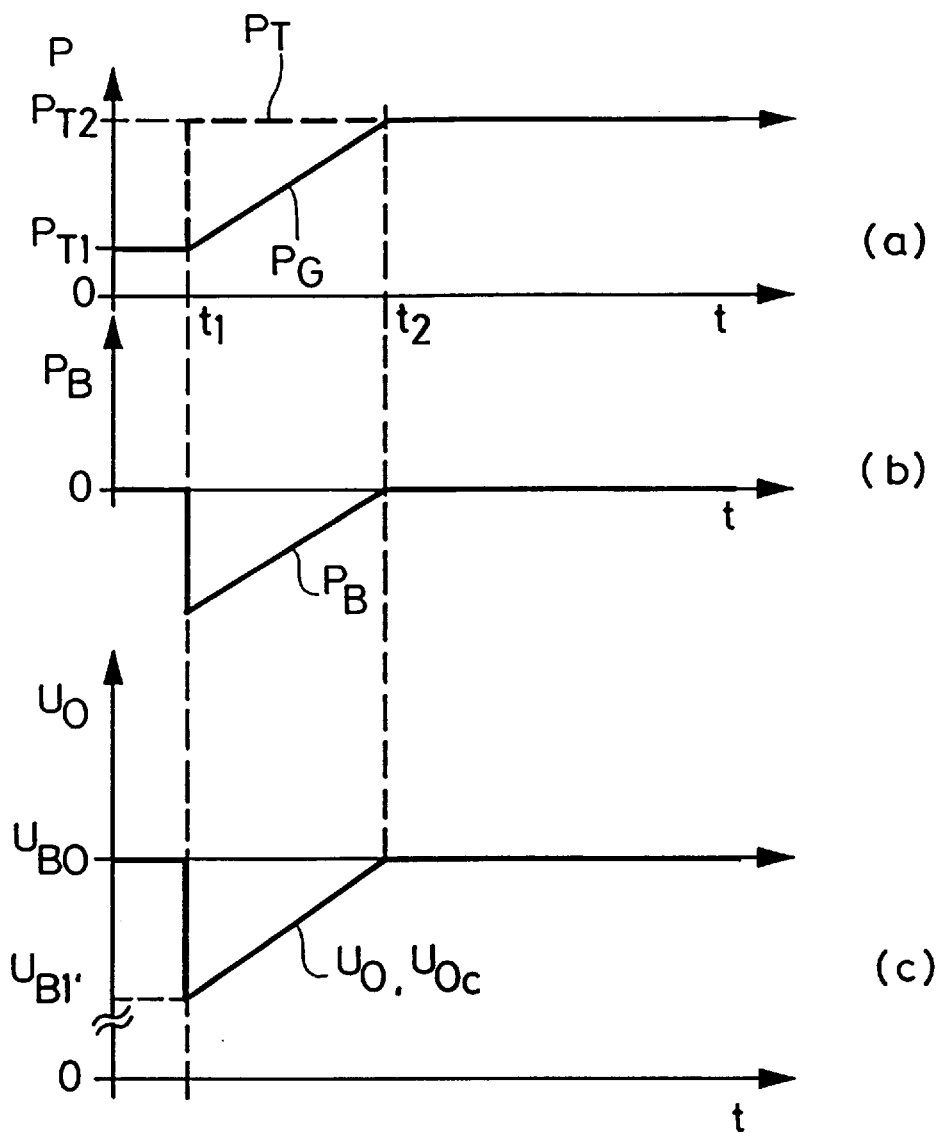
FIG. 7 shows the evolution of certain variables in the system as a function of time, for an increase in power requirement which may be covered by the generator set.

The diagrams of FIG. 7 illustrate the evolution of certain parameters as a function of time t in the system having the configuration according to FIG. 5, when the action of the driver on accelerator pedal 21 commands an increase in driving power which can be entirely covered by generator set 1. For the sake of simplicity, losses of energy and transient dynamic effects have been ignored. Diagram (a) shows that power $P_T$ desired by the driver and consumed by the driving set raises from $P_{T1}$ to $P_{T2}$ at the moment $t_1$ when the driver presses the accelerator. The electric power $P_G$ provided by generator set 1 in conformity with set-point signal $P_{Gc}$ then gradually increases to a value equal to $P_{T2}$ at moment $t_2$, then it remains at this value. Between $t_1$ and $t_2$, the difference in power $P_B=P_G-P_T$ is covered by the battery, as is shown by diagram (b). In order to draw this power from the battery, unit 32 temporarily lowers voltage $U_O$ of the supply circuit by imposing a corresponding desired voltage $U_{Oc}$, as is shown by diagram (c).

Figure 8:
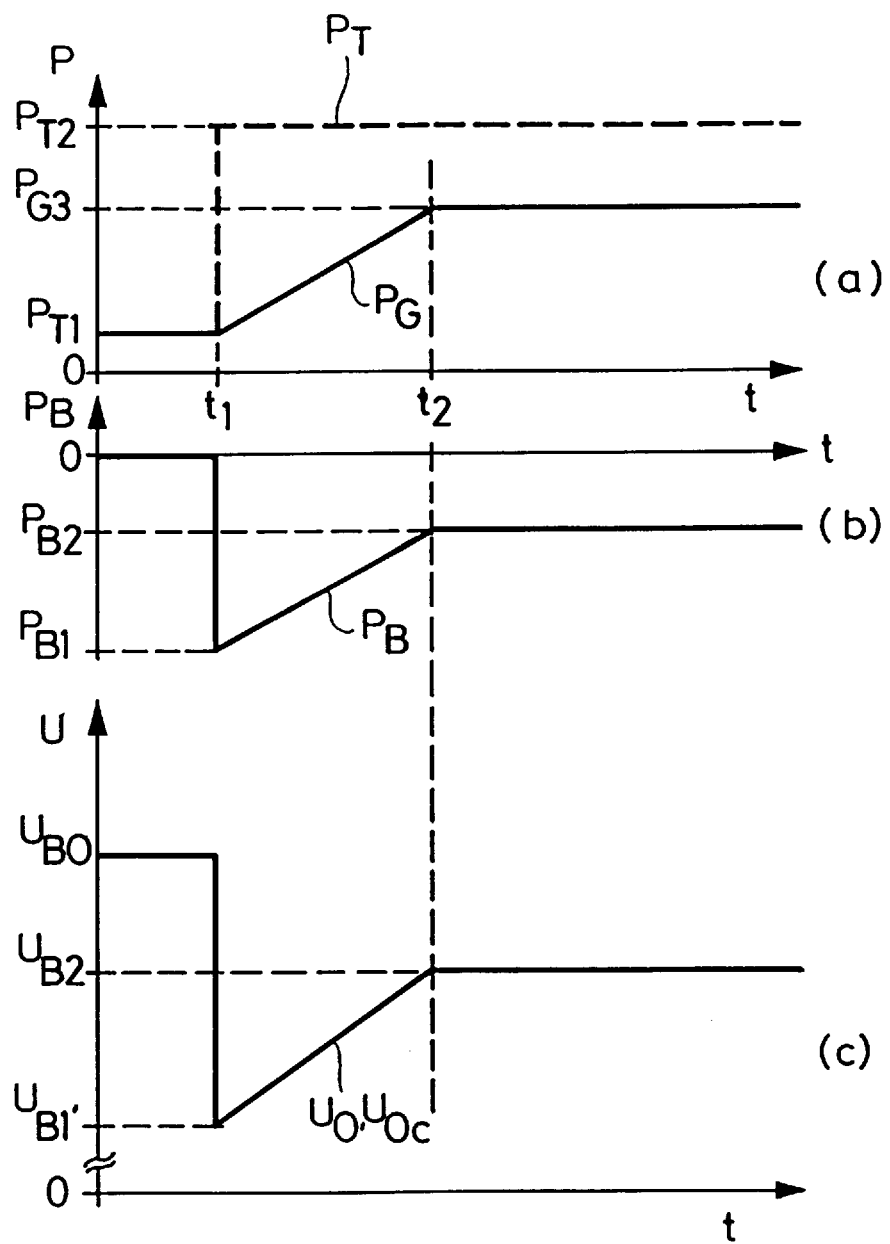
FIG. 8 shows the same variables as FIG. 7, but for an increase in power requirement which cannot be entirely covered by the generator set.

Diagrams (a), (b) and (c) of FIG. 8 correspond to those of FIG. 7, but for a case wherein power $P_G$ of the generator set cannot exceed a value $P_{G3}$ less than $P_{T2}$. Power $P_B$ provided by the battery, which was zero previously, passes to a value $P_{B1}$ at moment $t_1$, then decreases gradually to stabilise at $P_{B2}=P_{G3}-P_{T2}$ from moment $t_2$. These $P_B$ values are determined by corresponding values of $U_B=U_{Oc}$, as explained hereinabove.

Figure 9:
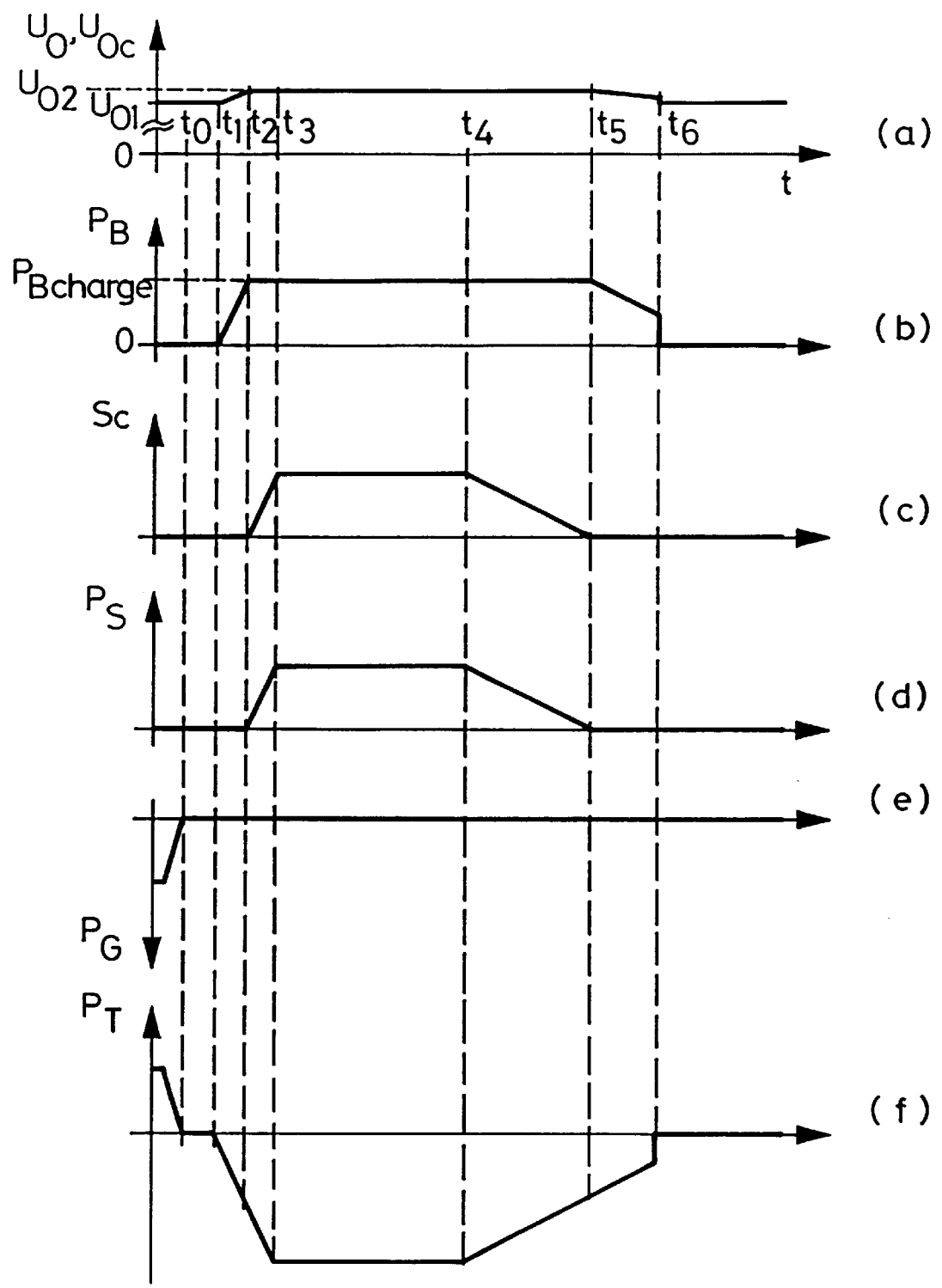
FIG. 9 shows the evolution of certain variables in the system as a function of time for the case of electric braking supplying the battery and the safety element.

FIG. 9 illustrates an electric braking case according to the present invention in a driving system which comprises, according to FIG. 1, a battery 6 and a safety element 7 and which is controlled according to the diagram of FIG. 5. Diagrams (a), (b), (e) and (f) show the evolution of parameters already described hereinabove. Diagram (c) shows the set-point signal Sc controlling safety element 7, and diagram (d) shows the power $P_S$ absorbed by such element.

Before a moment $t_0$, the vehicle is in driving mode, controlled by a signal T (FIG. 1 and 5), but the driver releases the accelerator and signal T disappears at moment $t_0$. At moment $t_1$ a braking command signal F appears, produced by an additional releasing of the accelerator or by the actuation of the brake pedal. Control unit 20 then causes desired voltage $U_{Oc}$ to increase, from its value $U_{O1}$ which corresponded to a zero battery current, until it reaches a value $U_{O2}$ corresponding to a maximum charge power $P_{Bcharge}$ (or a lower power) of the battery at moment $t_2$. Beyond this, the additional braking power will be absorbed by safety element 7 controlled by signal $S_c$ to reach a determined power $P_S$. The balance of the electric powers continues to be assured by battery 6 operating in the vicinity of its maximum charge power.

The same phenomena are repeated in reverse order from the moment $t_4$ when the braking power or torque (negative power $P_T$) required by signal F begins to decrease. This power is absorbed solely by the battery between $t_5$ and $t_6$, the moment at which the braking requirement ceases. Desired voltage $U_{Oc}$ then returns to its initial value $U_{O1}$.

It should be noted that in driving mode or in braking mode, the balancing of the power flows as described hereinabove will not be affected by the switching on of consumer element 8 shown in FIG. 1. Only control unit 20 will take account of such switching on in the calculation of the power distribution, by increasing the power to be provided by generator set 1 or battery 6 in driving mode, or by reducing the power to be absorbed by battery 6 or safety element 7 in braking mode. For this purpose, one of the signals X shown in FIG. 1 will be able to indicate to unit 20 the nominal switched on power of consumer element 8, without it being necessary to measure the precise power absorbed by such element.

Figure 10:
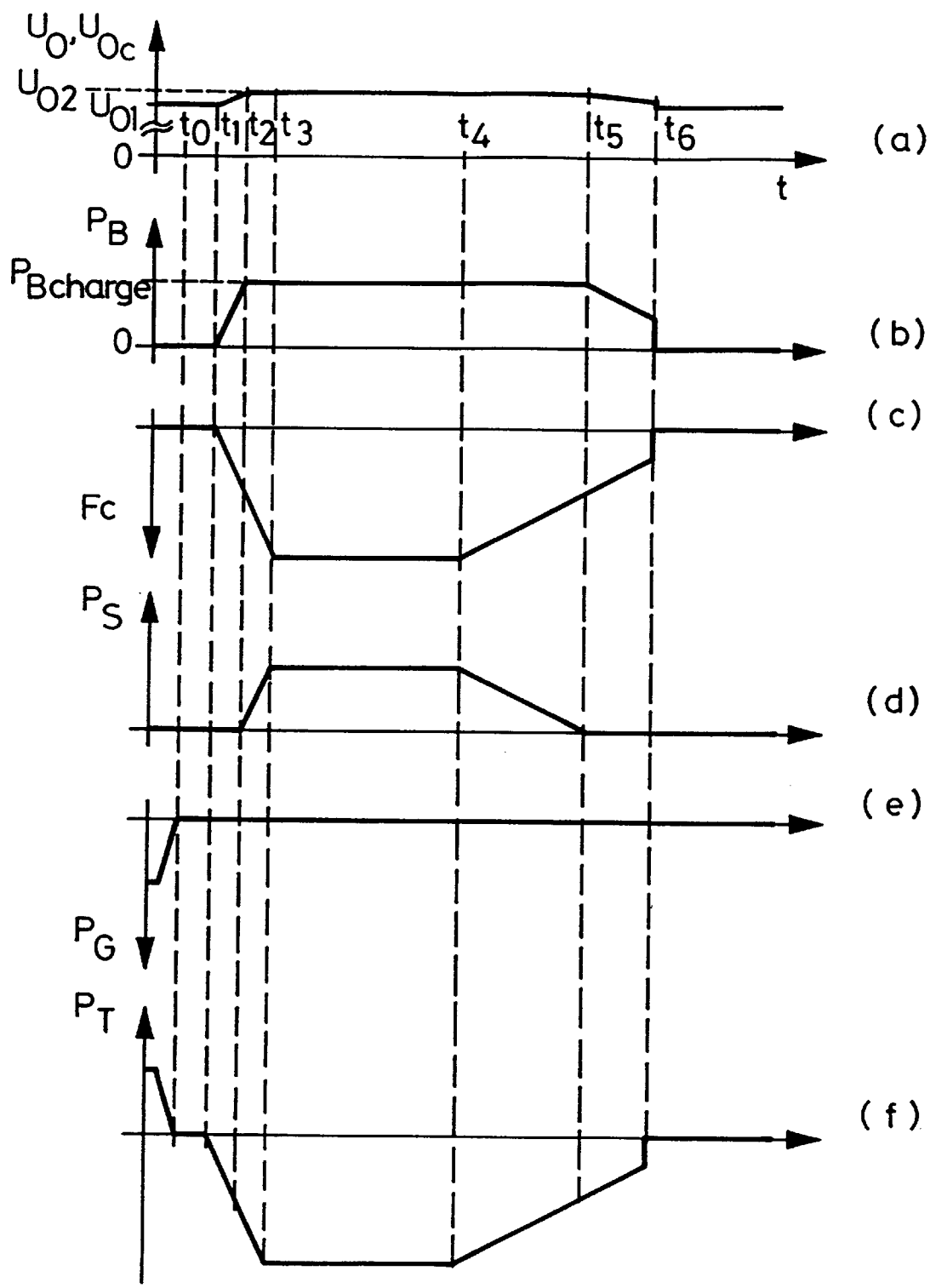
FIG. 10 is similar to FIG. 9, but illustrates another implementation mode of the method.

FIG. 10 is a similar representation to that of FIG. 9, but it illustrates another implementation of the method according to the invention in electric braking mode by means of battery 6 and safety element 7. In this case, the balancing of the electric powers by adjusting voltage $U_O$ is not effected on driving set 3, but on safety element 7. As is seen in FIG. 1, a second electronic adjusting device 38 is provided, which controls the power of safety element 7 in braking mode as adjusting unit 24 controls driving set 3 in driving mode.

In braking mode, unit 24 no longer receives the desired voltage signal $U_{Oc}$, but a braking torque set-point signal $F_c$. It then "forgets" its voltage adjustment and it controls negative power $P_T$ of the driving set directly as a function of $F_c$. Control unit 20 then supplies voltage set-point signal $U_{Oc}$ to adjusting unit 38, which also receives value $U_O$ and consequently controls an increase or decrease in the power of safety element 7 via a signal $S_F$.

FIG. 10 shows the temporal evolution of the parameters of the system in the same circumstances as in FIG. 9. Diagrams (a), (b), (d), (e) and (f) are identical to those of FIG. 9. Diagram (c) shows the evolution of braking torque set-point signal $F_c$, producing an evolution comparable to braking power $P_T$. Until moment $t_2$, the parameters shown vary as in FIG. 9. From this moment, since set-point signal $U_{Oc}$ can no longer increase in order not to overcharge battery 6, the increase in electric braking power $P_T$ tends to cause voltage $U_O$ of the supply circuit to increase, so that adjusting circuit 38 reacts and increases power $P_S$ of safety element 7 in order automatically to stabilise the voltage at value $U_{Oc}$. At moment $t_6$, braking command signal F having disappeared, the system reverts to adjusting in driving mode, $U_{Oc}$ resuming its initial value.

Figure 11:
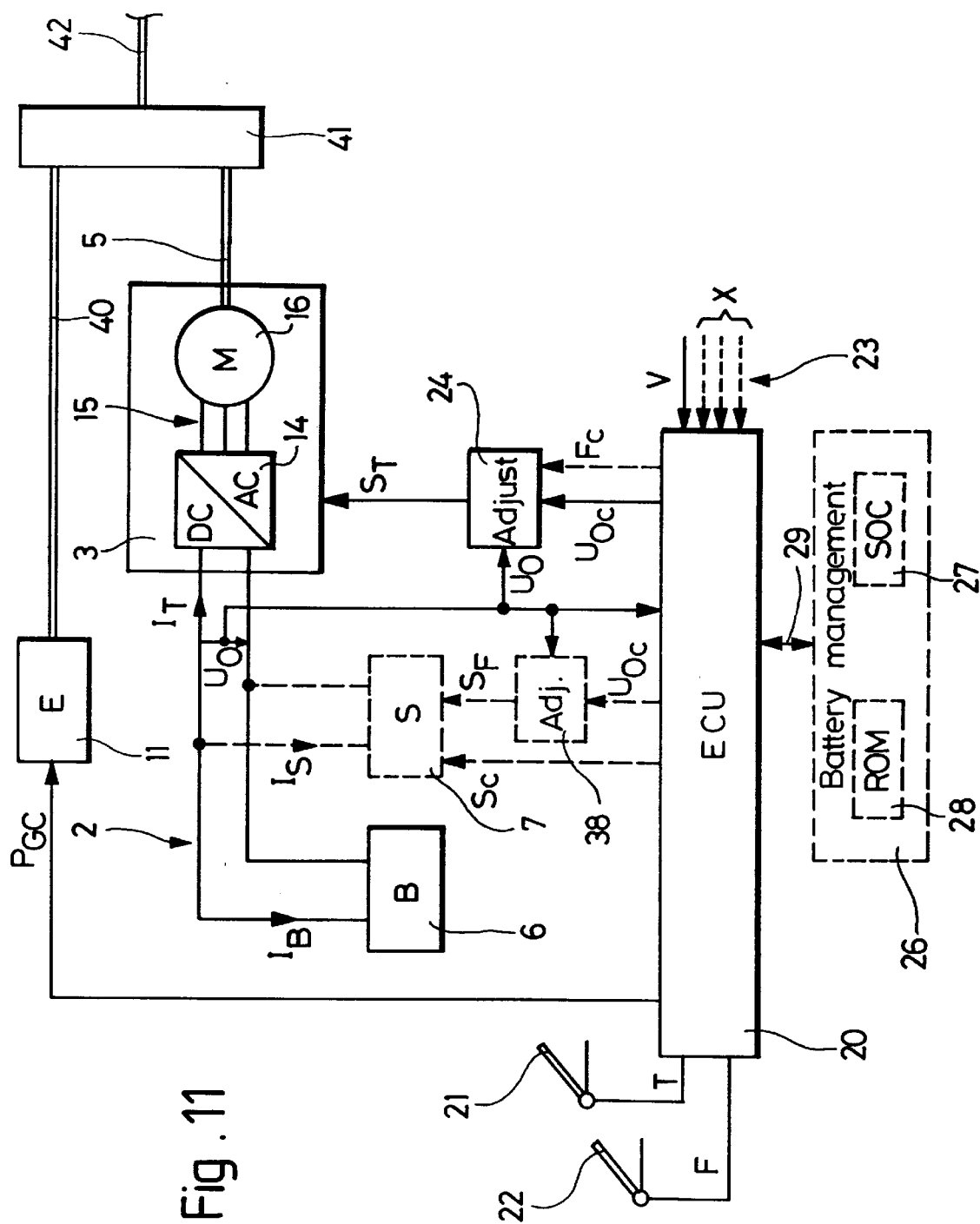
FIG. 11 is similar to FIG. 1, for the case of a parallel hybrid-powered vehicle.

The man skilled in the art will understand that the method according to the invention is applicable in the same manner to parallel or mixed hybrid-powered vehicles, since the calculation of the power flow distribution does not consider the electric power actually produced by generator set 1, but imposes a predetermined power on such set. FIG. 11 illustrates an example of a driving system of a parallel hybrid vehicle according to the invention, where the effect of generator set 1 is replaced by that of a thermal engine 11 mechanically driving the driving wheels by means of its output shaft 40, a gearbox 41 and a transmission shaft 42, in parallel with electric driving set 3. The power of engine 11 is controlled by set-point signal $P_{Gc}$ from control unit 20. The adjustment of the power of such set via adjustment of supply voltage $U_O$ may be effected exactly as has been described hereinabove. The same is true of a mixed driving system, for example, if a mechanical driving link was added to the system of FIG. 1 between the shaft of engine 11 and shaft 5 driving driving wheel 4.

Figure 12:
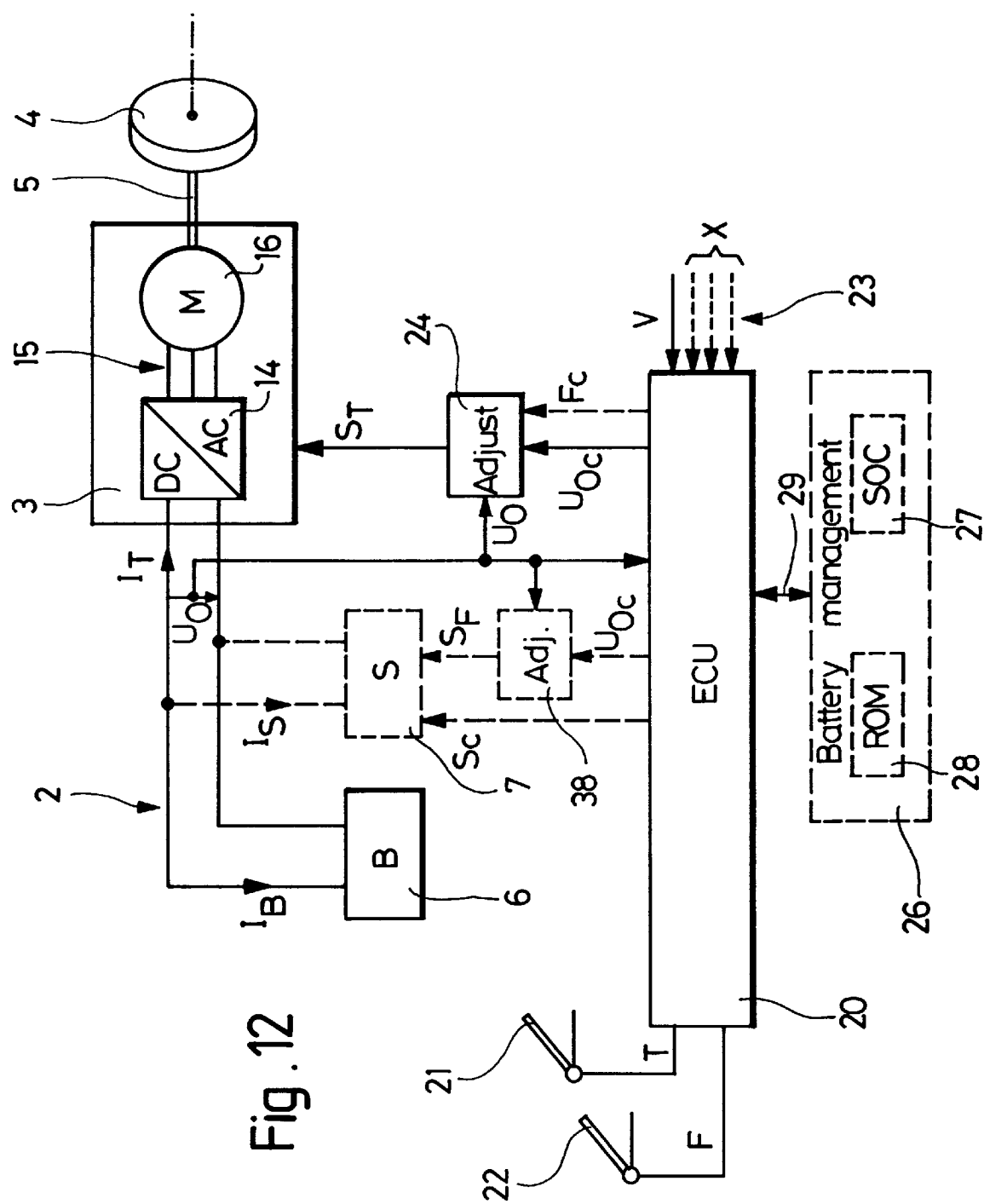
FIG. 12 is similar to FIG. 1, for the case of a purely electrically powered vehicle.

Of course, the method according to the invention can also be used in a vehicle whose driving system is entirely electric and supplied by battery 6 in traction mode, as is shown by FIG. 12. With respect to the system shown in FIG. 1, this means eliminating generator set 1 and the corresponding signal $P_{Gc}$. Such set could also be replaced by another adjustable electric power source such as a fuel cell whose power would be controlled by signal $P_{Gc}$.

What is claimed is:

1. A method for adjusting the electric power distribution in a direct voltage supply circuit in a motor vehicle comprising several electric elements capable of consuming and/or producing power in said supply circuit, one of said electric elements being an electric driving set capable of driving at least one driving wheel of the vehicle, comprising the steps of: (i) defining one of said electric elements as a power balancing element, which exchanges an adjusted power with the supply circuit, (ii) determining a desired voltage of the supply circuit, (iii) continually monitoring an effective supply circuit voltage, and (iv) adjusting said adjusted power of said balancing element so as to maintain said effective voltage at the level of said desired voltage.

2. A method according to claim 1, wherein one of said electric elements is a generator set capable of exchanging upon demand a first power with the supply circuit, wherein said first power is controlled on the basis of a power or torque requirement given by a driver of the vehicle, and wherein the balancing element is another of said electric elements.

3. A method according to claim 2, wherein the balancing element is the driving set.

4. A method according to claim 2, wherein said electric elements comprise, further to the balancing element, an electric battery having a state of charge and capable of exchanging electric power with said supply circuit, and wherein the state of charge of the battery is monitored and the desired voltage is determined as a function of said state of charge.

5. A method according to claim 1, wherein the balancing element is the driving set.

6. A method according to claim 1, wherein said electric elements comprise, further to the balancing element, an electric battery having a state of charge and capable of exchanging electric power with said supply circuit, and wherein the state of charge of the battery is monitored and the desired voltage is determined as a function of said state of charge.

7. A method according to claim 6, wherein in order to determine the desired voltage as a function of the state of charge, a predetermined characteristic relationship between the current and the voltage at the battery terminals is used for each state of charge.

8. A method according to claim 7, wherein in order to determine a zero value of the power exchanged between the battery and the supply circuit, the desired voltage is determined as equal to a no-load voltage of the battery for its present state of charge.

9. A method according to claim 7, wherein in order to bring the battery to a desired state of charge which is less or greater than its present state of charge, the desired voltage is determined as equal to a no-load voltage of the battery at the desired state of charge.

10. A method according to claim 6, wherein said electric elements comprise a safety element intended to consume surplus power when the driving set is used for electric braking, wherein, in case of electric braking, the safety element is made to operate at a determined power and the driving set is used as a balancing element supplying power to the supply circuit.

11. A method according to claim 1, wherein said electric elements comprise a safety element intended to consume surplus power when the driving set is used for electric braking, wherein, in case of electric braking, the safety element is made to operate at a determined power and the driving set is used as a balancing element supplying power to the supply circuit.

12. A method according to claim 1, wherein said electric elements comprise a safety element intended to consume surplus power when the driving set is used for electric braking, wherein, in case of electric braking, the driving set is made to operate at a determined electric power and the safety element is used as a balancing element consuming said power or at least a part of said determined electric power if a battery is connected to the supply circuit.

13. A motor vehicle driving system comprising several electric elements capable of consuming and/or producing power in the supply circuit, one of said elements being an adjustable electric driving set capable of driving at least one driving wheel of the vehicle, and control means arranged for controlling the power of one of said electric elements, defined as a power balancing element, which exchanges a second power with the supply circuit, said control means being arranged so as to constinously monitor an effective supply circuit voltage, wherein said control means comprise an electronic adjustment unit associated with the balancing element and arranged for adjusting the power of the latter on the basis of a desired voltage defined by the control means, so as to maintain said effective voltage at the level of said desired voltage.

14. A driving system according to claim 13, wherein one of said electric elements is a generator set capable of providing upon demand a first power to a direct voltage supply circuit, wherein said control means are arranged for controlling said first power on the basis of a power command given by a driver of the vehicle, and wherein the balancing element is another of said elements.

15. A driving system according to claim 14, wherein the balancing element is the driving set.

16. A driving system according to claim 13, wherein the balancing element is the driving set.

17. A driving system according to claim 13, wherein said electric elements comprise, further to the balancing element, an electric battery connected to the supply circuit.

18. A driving system according to claim 17, wherein said electric elements comprise a safety element intended to consume surplus power when the driving set is used for electric braking.

19. A driving system according to claim 13, wherein said electric elements comprise a safety element intended to consume surplus power when the driving set is used for electric braking.

* * * * *